Jan. 28, 1969   M. L. THATCHER   3,424,326
LOG HANDLING APPARATUS

Filed May 11, 1966   Sheet 1 of 2

INVENTOR
MURRAY L. THATCHER
BY Richard E. Bachman
ATT'Y.

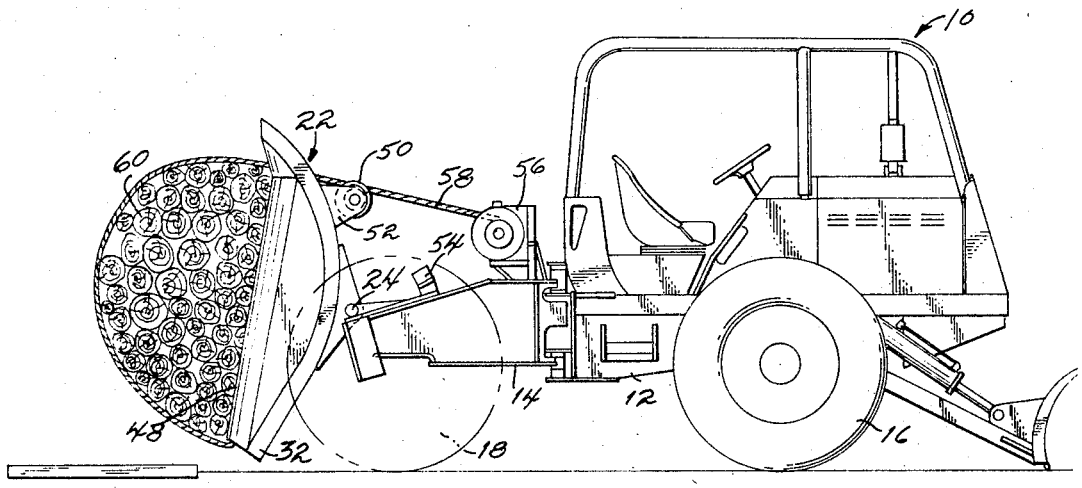
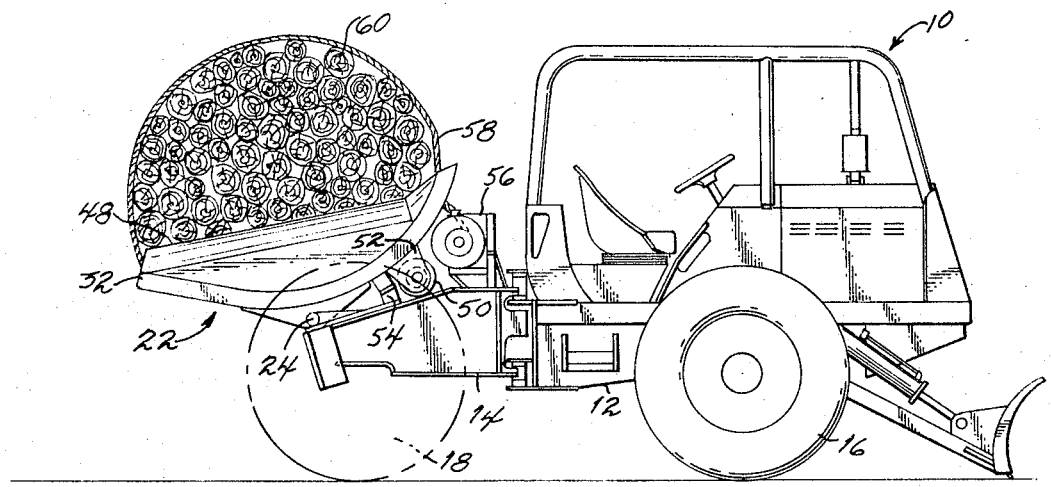

United States Patent Office 3,424,326
Patented Jan. 28, 1969

1

3,424,326
LOG HANDLING APPARATUS
Murray L. Thatcher, La Prairie, Quebec, Canada, assignor to International Harvester Company, Chicago, Ill., a corporation of Delaware
Filed May 11, 1966, Ser. No. 549,333
U.S. Cl. 214—505        12 Claims
Int. Cl. B60p 1/04, 1/00

ABSTRACT OF THE DISCLOSURE

A log handling apparatus for use with a logging vehicle to load, transport and unload log sections having a log supporting cradle having log supporting surfaces mounted at one end of the vehicle by a pivotal connection for pivotal movement about a transverse axis between a substantially vertical loading position and a substantially horizontal transporting position, said pivotal connection being located on the cradle above the vertical centerline of said cradle whereby the cradle will have a tendency to move to the vertical loading position; a winch mounted intermediate the ends of the vehicle, the winch including a cable which is adapted to bind the log sections together, and, guide means mounted on the cradle above the pivotal connection for guiding the cable to and from the winch and for receiving a force from the cable to pivot the cradle into the transporting position pursuant to the log sections being winched onto the cradle.

---

This invention relates to logging vehicles and more particularly relates to an improved log handling apparatus for use with logging vehicles in which logs such as pulpwood may be easily loaded, safely transported over rough terrain, and quickly unloaded at the desired location.

In logging operations existing log handling techniques include the steps of: felling the trees, skidding the trees to a landing where they are cut into logs of the desired length, and then transporting the logs to their destination. Another technique is to fell the trees and immediately cut the trees into four-foot lengths of pulpwood. The pulpwood is then moved by means of sleds or trucks to the landing for subsequent transportation. The need has been recognized to provide an apparatus which will efficiently and safely load, transport, and unload such pulpwood in logging areas where the terrain may be rough or even swampy.

Accordingly it is an object of the present invention to provide a novel log handling apparatus for use with a logging vehicle to load logs such as pulpwood, transport the same over difficult terrain, and then quickly unload at the desired location.

Another important object of this invention is to provide a logging vehicle in which a cradle is mounted at one end of the vehicle for pivotal movement between loading and transporting positions, in which a power winch on the vehicle draws a load such as a pulpwood bundle onto the cradle and pivots the cradle to the transporting position wherein the load is positioned substantially forward for improved vehicle stability, and in which unloading is effected by releasing the winch and allowing the cradle to pivot rearwardly.

Still another object is to provide a log handling apparatus for use with a logging vehicle in which a log supporting cradle is mounted at one end of the vehicle for pivotal movement about a transverse axis between loading and transporting positions, in which a winch mounted on the vehicle incorporates a cable for binding the log sections together, and in which means are mounted on the cradle for guiding the cable to and from the winch whereby the cradle will pivot to the transporting position as the log sections are winched onto the cradle.

Other objects and advantages of the present invention will become apparent to those skilled in the art when the following specification is read in conjunction with the accompanying drawings wherein:

FIGURE 3 is a side elevation view of the logging vehicle of FIGURE 1 in which the pulpwood has been winched onto the cradle;

FIGURE 4 is a side elevation view of the logging vehicle showing the cradle and pulpwood pivoted into the transporting position.

Figure 1:
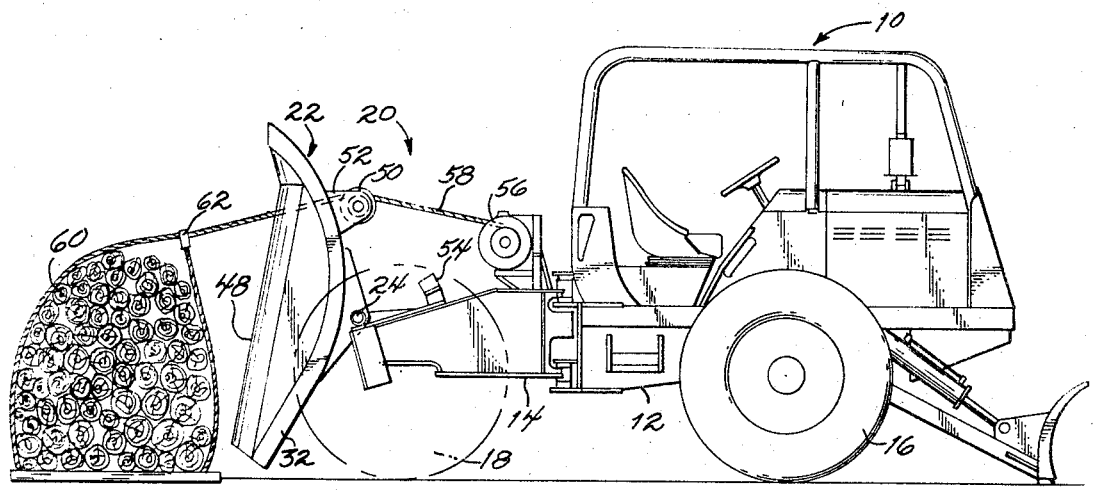
FIGURE 1 is a side elevational view of a logging vehicle incorporating the log handling apparatus embodying features of the present invention wherein the cradle of the apparatus is illustrated in a position for loading a bundle of pulpwood.
Figure 2:
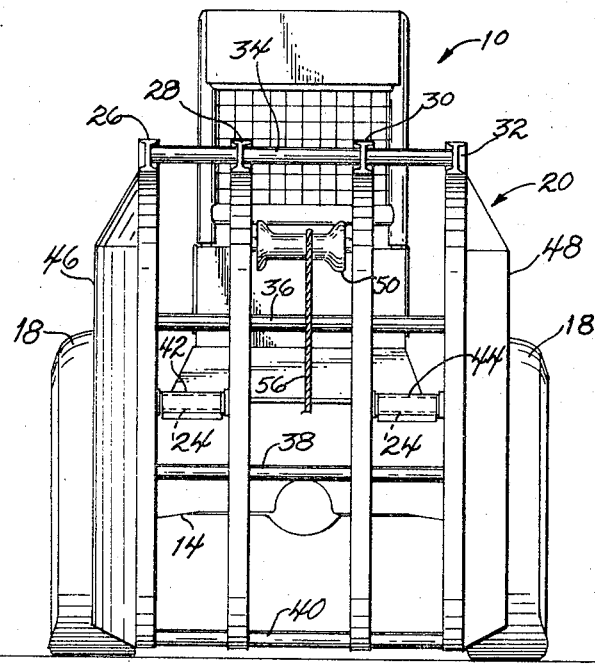
FIGURE 2 is a rear elevation view of the logging vehicle of FIGURE 1.

Referring now to the drawings, FIGURE 1 shows an articulated logging vehicle designated generally at 10. The vehicle 10 comprises a front frame section 12 articulated to a rear frame section 14 about a generally upright axis. Pairs of traction wheels 16 and 18 are provided on the front and rear frame sections, respectively, and are driven from the prime mover (not shown) through conventional drive train means.

The log handling apparatus of the present invention is illustrated generally at 20 and is carried on the rear frame section 14. The apparatus 20 comprises a cradle 22 pivotally mounted on the rear end of the frame section 14 about a transversely extending axis by means of a pair of laterally spaced-apart pins 24. The cradle 22 comprises a plurality of laterally spaced-apart upwardly concaved arcuate rib members 26, 28, 30 and 32 rigidly secured together by means of a plurality of transversely extendng brace members 34, 36, 38 and 40. Each pin 24 is secured between an adjacent pair of rib members 26, 28, and 30, 32. The pins in turn are journaled through bushings 42 and 44 mounted on the rear frame 14. A pair of sidewall members 46 and 48 are rigidly secured to respective rib members 26 and 32 of the cradle. These sidewall members assist in holding the bundle of pulpwood on the cradle during the loading and transporting operations.

The cradle 22 further comprises means for guiding the cable of the winch through the cradle. In the preferred embodiment of this invention a roller member 50 is rotatably mounted about a transversely extending axis between the intermediate pair of rib members 28 and 30 by means of a pair of rearwardly extending brackets 52.

The cradle 22 pivots about the axis of pins 24 between the loading position as shown in FIGURE 1 and the transporting position as shown in FIGURE 4. A bumper member 54 is secured to the upper margin of rear frame 14 and functions to limit forward pivotal movement of cradle 22 as shown in FIGURE 4. The angle of inclination of cradle 22 in such transporting position is selected so that the load of pulpwood logs has a center of mass rearward of the cradle pins 24. This permits automatic unloading of the cradle as will hereinafter be more fully explained.

A power winch 56 is mounted on the rear frame section and is driven from the engine on the front frame section by means of a drive train (not shown) including a conventional universal joint connection positioned over the axis of articulation for the frame sections. A cable 58 is reeled on the drum of the winch and is guided through the cradle 22 in contact with the upper surface of the roller member 50.

To secure the pulpwood bundle 60 for loading, the free end of the cable is directed over and under the pulpwood and secured to the main line portion of the cable by means of a conventional ferrule connector 62. The winch is then reeled in to draw the pulpwood bundle onto the cradle as shown in FIGURE 3. Concurrent with this operation roller member 50 will guide the cable into the winch and center the pulpwood bundle on the cradle. During continued operation of the winch the cable will bear against roller 50 and create a couple acting to pivot the cradle forwardly about the pivot pins 24 until the rib member 30 contacts the bumper 54.

With the cradle in the transporting position, as illustrated in FIGURE 4, the center of mass of the pulpwood bundle 60 is positioned at a substantial distance forward as compared to the loading position. This distributes the weight of the load so that improved stability characteristics of the vehicle are achieved when traveling at high speeds over rough terrain. During this transporting operation the winch 56 functions to hold the cradle forward against the bumper 54.

After the vehicle has reached the unloading location the operator will manipulate the controls to unreel the winch. Because the center of mass of the pulpwood bundle is behind the pivot pins 24 gravity will pivot the cradle backwards and the pulpwood will slide to the ground. During the return trip to the loading site the cable may be secured to the uppermost end of the cradle and the winch reeled in to pivot the cradle forward into the transporting position.

In view of the foregoing description, it is clear that applicant has provided herein a new and improved log handling apparatus for use with a logging vehicle providing improved loading, transporting and unloading characteristics in which logs such as pulpwood bundles may be easily loaded and unloaded and in which the load is carried in a manner which improves vehicle stability for transporting the logs over uneven terrain.

While the embodiment herein is at present considered to be preferred, it will be understood that numerous variations and modifications may be made by those skilled in the art and it is intended to cover in the appended claims all such variations and modifications as fall within the true spirit and scope of the invention.

What is claimed is:

1. A log handling apparatus for use with a logging vehicle to load, transport, and unload log sections, comprising the combination of: a cradle having log supporting surfaces mounted at one end of the vehicle for pivotal movement about a transverse axis between a substantially vertical loading position and a substantially horizontal transporting position; a winch mounted intermediate the ends of the vehicle, the winch including a cable which is adapted to bind the log sections together; and, guide means mounted on the cradle for guiding the cable to and from the winch and for receiving a force from the cable to pivot the cradle into the transporting position whereby a winching action on the cable will first pull bound logs against the cradle and continued winching action will cause the cable to act upon said guide means so as to cause said cradle to pivot into a substantially horizontal position thereby placing the logs on top of said cradle for transportation.

2. The invention as defined in claim 1 wherein the cradle comprises: an upwardly concaved frame pivotally mounted intermediate its ends and at its lower margin to said one end of the vehicle, the frame being positioned to shift the mass of the log sections forward as the cradle pivots into the transporting position.

3. The invention as defined in claim 2 wherein the frame comprises: a plurality of transversely spaced-apart arcuate rib members, a plurality of transversely extending brace members secured to the rib members, and sidewall means mounted on the rib members to hold the log sections on the cradle.

4. The invention as defined in claim 3 wherein the means guiding the cable comprises: a roller member rotatably mounted between the brace members at a position centrally located transversely of the vehicle and vertically spaced from said transverse axis when the cradle is in the loading position.

5. The invention as defined in claim 1 wherein the means guiding the cable comprises a roller member rotatably mounted at a position on the cradle vertically spaced from said transverse axis when the cradle is in the loading position, the cable acting against the roller during loading of the log sections to pivot the cradle and log sections forward into the transporting position.

6. A log handling apparatus for use with a logging vehicle to load, transport and unload log sections, comprising the combination of: a cradle having log supporting surfaces mounted at one end of the vehicle by a pivotal connection for pivotal movement about a transverse axis between a substantially vertical loading position and a substantially horizontal transporting position, said pivotal connection being located on the cradle above the vertical centerline of said cradle whereby the cradle will have a tendency to move to the vertical loading position; a winch mounted intermediate the ends of the vehicle, the winch including a cable which is adapted to bind the log sections together, and, guide means mounted on the cradle above the pivotal connection for guiding the cable to and from the winch and for receiving a force from the cable to pivot the cradle into the transporting position whereby a winching action on the cable will first pull bound logs against the cradle and continued winching action will cause the cable to act upon said guide means so as to cause said cradle to pivot into a substantially horizontal position thereby placing the logs on top of said cradle for transportation.

7. In an article handling vehicle, an improved article handling apparatus comprising:
 (a) A loading, transporting and unloading log supporting platform mounted at one end of the vehicle for pivotal movement about a transverse axis between a substantially vertical loading position and a substantially horizontal transporting position,
 (b) A winch mounted intermediate the ends of the vehicle,
 (c) A cable adapted to bind articles together extending from the winch, to the rear of the platform,
 (d) Guide means mounted on the platform above the pivotal connection for guiding the cable and for receiving a force from the cable to pivot the platform into the horizontal position whereby a winching action on the cable will first pull bound logs against the cradle and continued winching action will cause the cable to act upon said guide means so as to cause said cradle to pivot into a substantially horizontal position thereby placing the logs on top of said cradle for transportation when bound articles are winched directly on the platform.

8. An apparatus as defined in claim 7 in which said platform comprises:
 (a) A frame member having raised side portions for preventing transverse movement of articles loaded on the platform.

9. The invention as defined in claim 6 wherein the cradle comprises: an upwardly concaved frame pivotally mounted intermediate its ends and at its lower margin to said one end of the vehicle, the frame being positioned to shift the mass of the log sections forward as the cradle pivots into the transporting position.

10. The invention as defined in claim 9 wherein the frame comprises: a plurality of transversely spaced-apart arcuate rib members, a plurality of transversely extending brace members secured to the rib members, and sidewall means mounted on the rib members to hold the log sections on the cradle.

11. The invention as defined in claim 10 wherein the means guiding the cable comprises: a roller member rotatably mounted between the brace members at a position centrally located transversely of the vehicle and vertically spaced from said transverse axis when the cradle is in the loading position.

12. The invention as defined in claim 11 wherein the means guiding the cable comprises a roller member rotatably mounted at a position on the cradle vertically spaced from said transverse axis when the cradle is in the loading position, the cable acting against the roller during loading of the log sections to pivot the cradle and log sections forward into the transporting position.

References Cited

UNITED STATES PATENTS

| 2,161,734 | 6/1939 | Weless | 214—523 XR |
| 2,491,030 | 12/1949 | Budreau. | |
| 3,167,200 | 1/1965 | Booker | 214—523 |

FOREIGN PATENTS 484,742  7/1952  Canada.

ALBERT J. MAKAY, *Primary Examiner.*

U.S. Cl. X. R.

214—85.5